United States Patent [19]

Vogel

[11] Patent Number: 4,930,160
[45] Date of Patent: May 29, 1990

[54] AUTOMATIC CENSORSHIP OF VIDEO PROGRAMS

[76] Inventor: Peter S. Vogel, 28 Adeline Street, Faulconbridge NSW 2776, Australia

[21] Appl. No.: 237,176

[22] Filed: Aug. 29, 1988

[30] Foreign Application Priority Data

Sep. 2, 1987 [AU] Australia .................................. PI4107

[51] Int. Cl.$^5$ .............................................. H04K 1/00
[52] U.S. Cl. ........................................ 380/23; 358/84;
  358/349; 455/2; 455/4; 380/20; 340/825.34
[58] Field of Search ........................................ 380/3–5,
  380/23, 20; 364/200, 900, DIG. 545; 358/84,
  86, 139, 908, 349; 455/2, 4–6, 67–70;
  340/825.31, 825.34

[56] References Cited

U.S. PATENT DOCUMENTS

| | | | |
|---|---|---|---|
| 3,859,457 | 1/1975 | Kirk, Jr. | 358/86 X |
| 3,919,479 | 11/1975 | Moon et al. | 358/84 X |
| 4,331,974 | 5/1982 | Cogswell et al. | 358/86 |
| 4,520,404 | 5/1985 | Von Kohorn | 358/84 X |
| 4,530,008 | 7/1985 | McVoy | 380/23 |
| 4,605,973 | 8/1986 | Von Kohorn | 455/4 X |
| 4,620,229 | 10/1986 | Amano et al. | 358/349 |
| 4,685,131 | 8/1987 | Horne | 358/86 X |
| 4,718,107 | 1/1988 | Hayes | 455/4 |
| 4,750,213 | 6/1988 | Novak | 455/67 |
| 4,814,883 | 3/1989 | Perine et al. | 358/84 X |

Primary Examiner—Stephen C. Buczinski
Assistant Examiner—Bernarr Earl Gregory

[57] ABSTRACT

A video program is received from a broadcast or video recording and displayed for viewing. On receipt of a prescribed classification code or group of codes display is switched to an alternative source. The classification code can be encoded into the broadcast or tape being viewed, or can originate from a separate source. The alternative material displayed can be another broadcast, a local recording, a locally-generated pattern, or other material. The codes which cause the display to be switched to the alternative source can be set by the user after entering a personal identity number.

26 Claims, 5 Drawing Sheets

AUTOMATIC CENSORSHIP OF VIDEO PROGRAMS

FIELD OF THE INVENTION

The present invention relates to methods of, and apparatus for, automatic censorship of video programs. The term video program used hereinafter refers to television programs broadcast free-to-air or by cable or by satellite, and other forms of mass distribution of video programs, including distribution by video tape or other media. The term also includes an accompanying audio signal if any.

BACKGROUND OF THE INVENTION

The need for censorship of video material is generally accepted by most societies, for the purposes of preventing the viewing of material by persons other than the target audience. Usually, such censorship takes the form of limiting access of a certain group of people, for example children, to a certain class of material, for example pornographic or violent movies. Other uses of censorship include voluntary self-censorship in cases where a recipient of a program does not wish to be exposed to certain types of program, for example scenes of great violence, advertisements which may be considered offensive, or non-program material which interrupts movies, drama or sports broadcasts.

Being the most widely accessible form of broadcasting, television is the medium with which the problem of censorship is experienced most. Traditionally, censorship of television takes the form of either preventing possibly offensive material from being broadcast in the first place, or voluntary self-censorship, that is, switching off the receiver when material which the viewer does not wish to experience is being broadcast. Another form of self-censorship, which has gained popularity since the introduction of remote controls for television sets is the phenomenon known as "zapping". Zapping involves eliminating unwanted material by muting the receiver or changing channels for the duration of the unwanted segment. While such self-censorship offers the benefit that all classes of material remain available to those who do not find them objectionable, it suffers from the inconvenience of having to anticipate the nature of broadcasts and operate the receiver appropriately. This process is tedious and error-prone, especially where the viewer wishes to suppress program material which changes rapidly in nature, for example when the viewer desires to suppress commercial messages within an otherwise unobjectionable program. Manual censorship is therefore not an entirely satisfactory solution.

It is therefore desirable to provide means whereby display of preselected classifications of program material can be automatically suppressed.

Arrangements for automatic censorship have been previously published, but suffer from a number of serious shortcomings. The main difficulty is that automatic means for discrimination of different program classifications, for example detection of television commercials, have been complex and unreliable. One technique has been to detect television commercials by the short period of black picture and silence separating them from other program material. A typical commercial-deleter of this type is described in U.S. Pat. No. 4,319,286. This system and others like it suffer from the problem that erroneous operation occurs if there is a brief period of black and silence in a broadcast at a time other than at the beginning of a commercial break, or if there is no separation between commercials and other program material. Furthermore, such systems are unable to distinguish between resumption of desired program and further commercials at the conclusion of a commercial. Resumption of viewing or recording must therefore be controlled by some form of timing device, based on assumptions regarding the length of commercial breaks. If these assumptions are not correct, the system will fail in its function.

A much improved censorship means is described in U.S. Pat. No. 4,520,404. This system relies on a human operator to classify broadcasts, based on observation at a monitoring station. A suitably coded message is distributed from the monitoring station to the viewer's home, at which point a suitably-equipped decoder controls the television receiver or video recorder in accordance with the classification data generated by the human operator at the monitoring station. Although this invention significantly improves upon the reliability of previous methods, it nevertheless suffers significant limitations. One limitation is the difficulty of accurately predicting at the monitoring station when a change of program is going to occur, making the system somewhat error prone. Another limitation is that when the system is used under the control of one party to control the viewing of another party, for example used by parents to limit viewing by children, it is necessary to provide control means by which the class of program to be censored can be selected, and it is therefore possible for the other party to use these controls to disable the censorship, thereby defeating the function of the system. Yet another limitation is that during the period that unwanted material is being censored, the receiver is simply disabled. The viewer is therefore periodically presented with a blank screen and/or silence, which may have the undesirable effect of causing alarm when program suddenly resumes, or may be mistaken for a receiver malfunction.

The prior art methods are also deficient in that they do not provide means whereby an authorized person can selectively disable viewing of certain classifications of pre-recorded video programs.

SUMMARY OF THE INVENTION

The present invention is directed to providing novel and improved means and method of receiving video programs whereby the censorship function is provided automatically, substantially resolving the abovementioned shortcomings of the prior art as well as providing other benefits.

According to a first aspect of the present invention, there is provided a video program receiving method capable of automatically censoring video programs comprising the steps of receiving a video program, with accompanying audio if any, receiving a classification signal indicative of the content of the program being received, decoding the classification signal and, according to functions selected by the user, causing the receiver to direct to its output alternative program material for the duration of program of selected classification.

According to a second aspect of this inventive concept, apparatus for receiving and automatically censoring video program is also provided, and comprises a video program receiver, a classification signal receiver, a controller equipped to decode said received signal and to control switching means which, according to functions selected by the user at the receiving station, cause the receiver to direct to its output alternative program material for the duration of program of selected classification.

The term "receiver" used herein is defined in the broad sense of apparatus for converting television signals (and their associated sound signals) into visual and audible signals, or apparatus for converting modulated carrier signals into video and/or audio signals suitable for display by video monitors or audition via amplifiers and loudspeakers. For example, the term receiver includes off-air domestic television sets, as well as apparatus known commonly as a "video monitor". The term "receive" is used in the broad sense of accepting signal from any signal conveyance means, for example, from an antenna, cable, optical fiber, magnetic tape, or optical disk.

Some embodiments of this invention also include an arrangement for enabling access to selection of classifications to be censored only upon entering of a security code, or personal identification number (PIN), by the user.

BRIEF DESCRIPTION OF THE DRAWINGS

Some embodiments of the present invention will now be described, by way of example only, with reference to the drawings in which.

DETAILED DESCRIPTION

Figure 1:
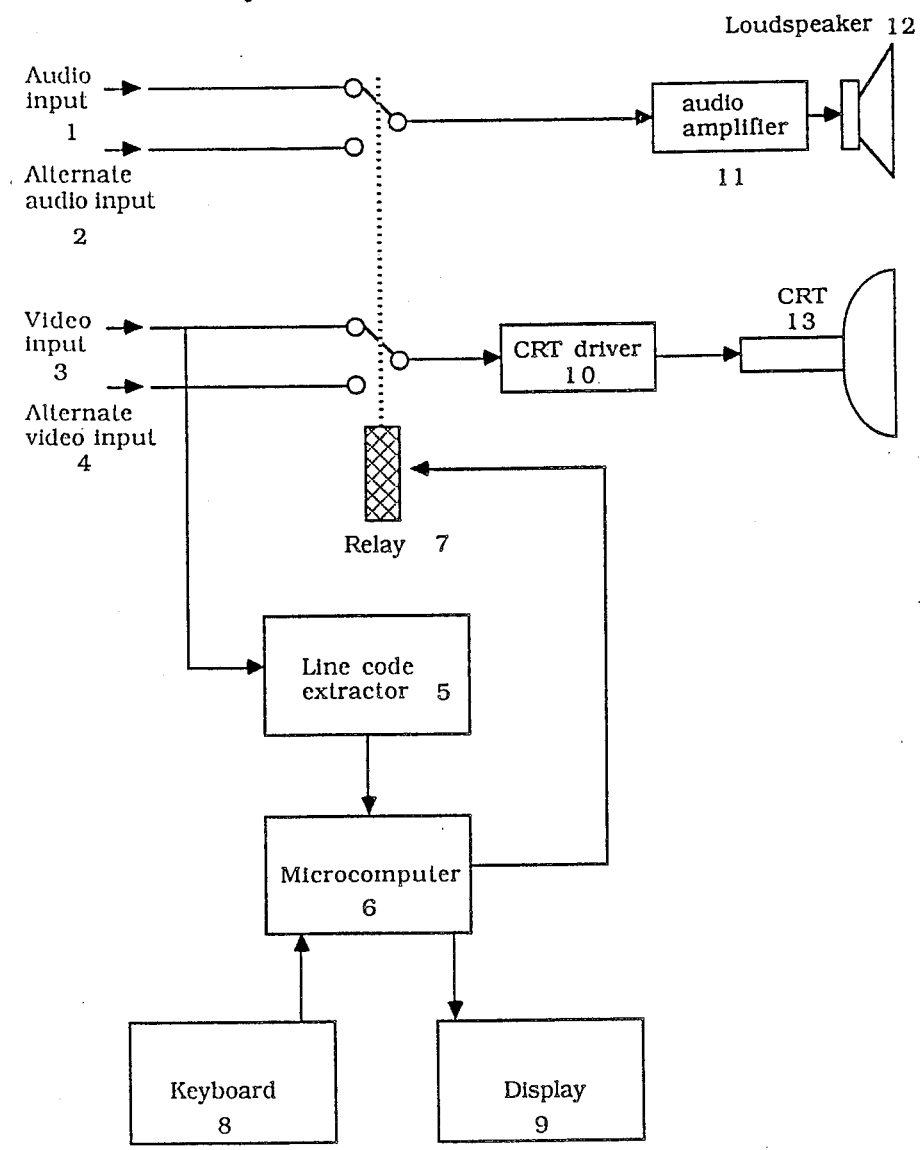
FIG. 1 is a schematic block diagram of a first embodiment of the invention in which the program classification is encoded into the vertical interval of the video signal.

As seen in FIG. 1 this embodiment of the invention comprises the conventional components of a television receiver or monitor, including audio amplifier 11, loudspeaker 12, CRT driver 10 and CRT 13. Under normal conditions, the sources of video and audio are selected from video input 3 and audio input 1 respectively. However when the selector means, relay 7 is energized, alternate audio input 2 and alternate video input 4 are selected instead. Both sets of audio and video inputs may derive from any source, for example a television tuner or video tape player.

The operation of this embodiment relies on the presence of a program classification code within the video signal. This can be provided in a number of well known ways which ensure that the presence of such codes do not interfere with the normal operation of television receivers. The method used in this embodiment is encoding of a digital word in the form of black and white transitions located on line 16 of the video signal. This position is chosen so as to be invisible on the CRT display. The technology for this form of signalling is well known, being commonly used for data broadcasting services such as Teletext. The classification may be pre-recorded on tapes being broadcast or played locally, or inserted in a video signal prior to transmission at the broadcasting station at the time of broadcast. The means for inserting such signals is well known.

Upon arrival at video input 3 of the invention, as well as being fed to the display system, the video portion of the program is fed to line code extractor 5, which comprises means for isolating the desired line (in this embodiment line 16), extracting the digital word from that line, and presenting it as an output readable by microcomputer 6.

Microcomputer 6 is a self-contained "single chip computer" including RAM, ROM, IO ports, CPU and NV (non-volatile) memory. Of course, microcomputer 6 may also perform many other functions required by the receiver, as well as those of this invention. One of the output ports of microcomputer 6 controls relay 7. Other ports read data from keyboard 8 and send data to display 9.

Keyboard 8 is a press-button key array, which contains keys for control of all the usual television functions, as well as special keys used by this invention. The special keys include a SET CLASSIFICATION key, used for entering the classifications to be censored, an OVERRIDE key, used to disable the censorship function, and a RESUME key, used to resume censorship after OVERRIDE. The usual channel selection keys of the receiver of this embodiment serve the double purpose of allowing the user to enter a PIN (personal identity number). Similarly, the other keys can serve double functions if desired.

Display 9 is used to signal the user as required. In this embodiment it comprises an eight character liquid crystal display. In other embodiments other forms of display can be used, including single LEDs, or a video character generator which causes characters to be superimposed on the CRT display.

Figure 2:
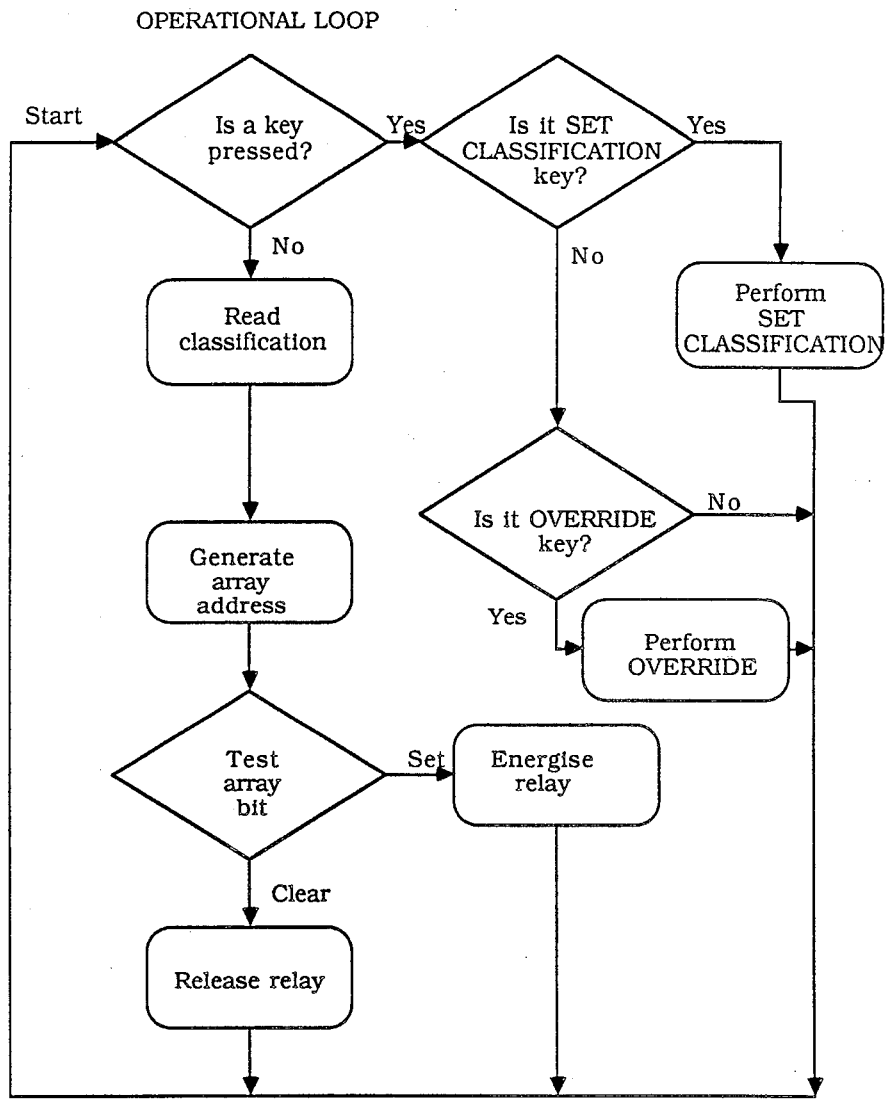
FIG. 2 is a schematic diagram of the operational loop of the program executed by the microcomputer of the first embodiment.

The censorship function of the invention is performed by the arrangement of FIG. 1 executing the program described schematically in FIG. 2.

Referring now to FIG. 2, the program starts by scanning the keyboard to test for a key depression. If no key is pressed, the classification code, arriving from line code extractor 5, is read, and an address is generated as a function of the code. A table is stored in the RAM of microcomputer 6, the address of each data bit of the table corresponding to a unique classification code, and the state of each bit so addressed indicating the classification status, namely ENABLED or DISABLED. A set bit indicates DISABLED, while a clear bit indicates ENABLED. Having generated an address from the received code, microcomputer 6 then applies this address to the table, and tests the corresponding data bit. If the bit is set, relay 7 is energized, causing the video and audio signals to be switched to the alternate sources. If the bit is clear, relay 7 is released, with the opposite effect. This procedure is repeated as a loop at high speed, so that the operation of relay 7 follows instantaneous changes in classification codes arriving at the video input of the invention.

In order to allow authorized users to select whether a given classification code is to be enabled or disabled, the program of FIG. 2 also continually scans the keyboard, testing for depression of the SET CLASSIFICATION key. If this key is pressed, the SET CLASSIFICATION routine is performed, according to FIG. 3.

Figure 3:
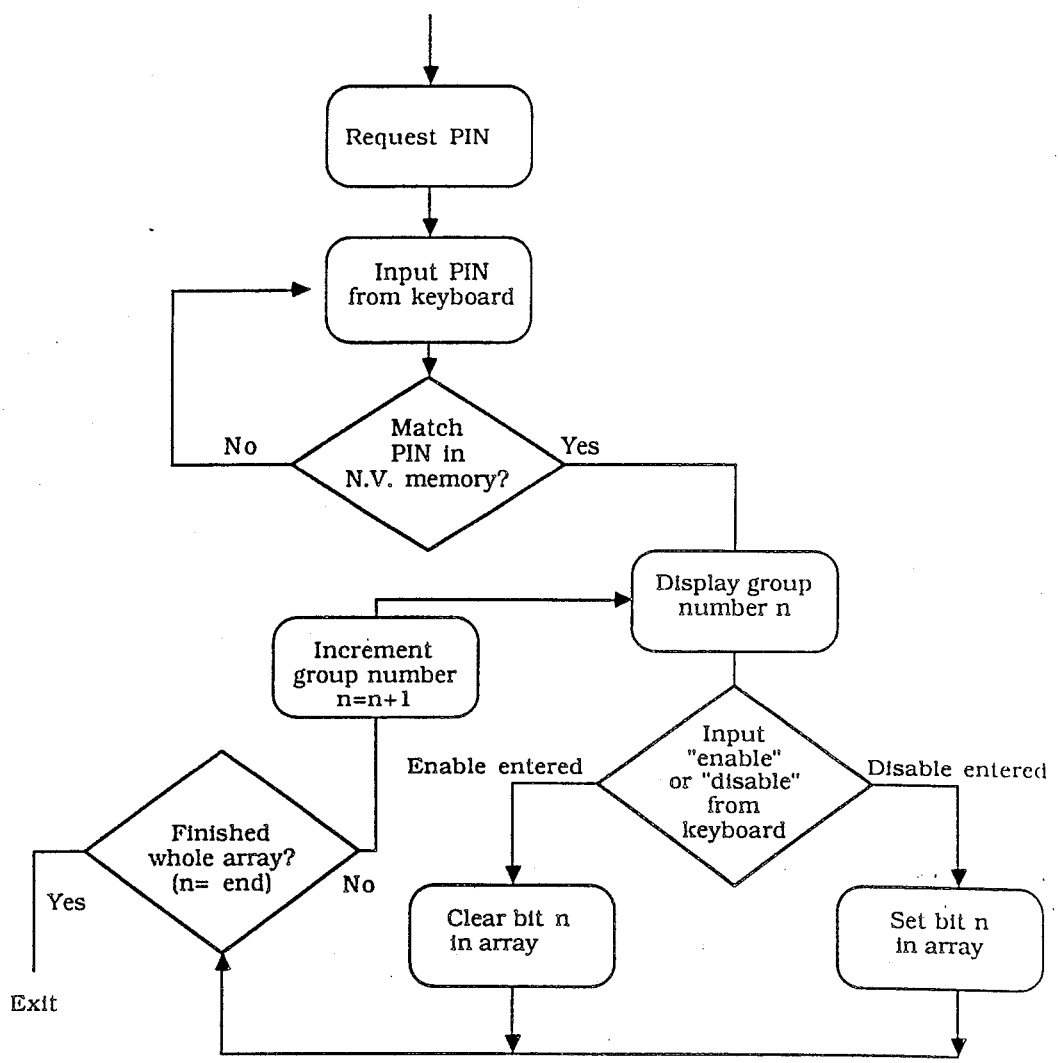
FIG. 3 is a schematic diagram of the software used in either embodiment for setting classifications.

Referring now to FIG. 3, when the SET CLASSIFICATION key has been pressed, microcomputer 6 first requests, via display 9, that the user enter the PIN. A number is then input, in this embodiment three digits being used for security, and compared to the PIN stored in the NV memory of microcomputer 6. If the number does not match, the request is repeated. If the number does match, the first classification group number is displayed, and the user is requested to enter enable or disable, using two designated keys of keyboard 8. If enable is entered, the first bit of the code array is cleared. If disable is entered, the bit is set. A test is then performed to see whether the last element of the array has been programmed. If it has, control is returned to the operational loop, if not, the next array element is addressed, and the input cycle repeated for the next classification code.

In this embodiment the array comprises three bits, corresponding to the classifications:

1. Advertisement (commercial product or service promotion)
2. Non-program material (includes advertisements, station identification, community service announcements, commentary during movies etc.)
3. Restricted. Programs deemed by the government censors to be unsuitable for viewing by children.

The coding scheme of this embodiment uses an eight bit word, so that up to 256 classifications can be supported. The 253 unused bits of the array are cleared, so that all classifications other than the three listed above are always enable. If desired, this range of classifications can be extended greatly, by increasing the size of the memory array.

When an authorized person, for example a parent, desires to watch a program of disabled classification, it may be inconvenient to re-define the classifications enabled. For convenience, this embodiment provides an override function, which is invoked by pressing the OVERRIDE key of keyboard 8. Depression of this key is detected by the test in the operational loop of FIG. 2, and results in the execution of the override routine of FIG. 4.

Figure 4:
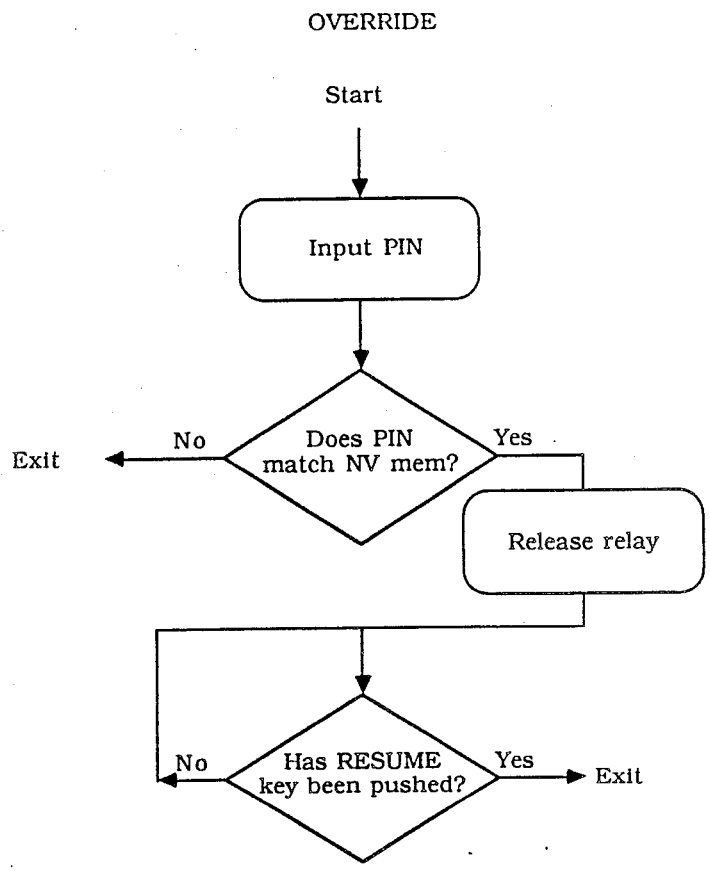
FIG. 4 is a schematic diagram of the software used in either embodiment for overriding the censorship function.

Referring to FIG. 4, on entry to the override routine, the PIN is requested from the user. If the PIN does not match the number stored in NV memory, the routine terminates. If the correct PIN has been entered, relay 7 is released, and the program continues looping until the RESUME key is pressed, with the result that no censoring action occurs until the RESUME key is pressed.

Figure 5:
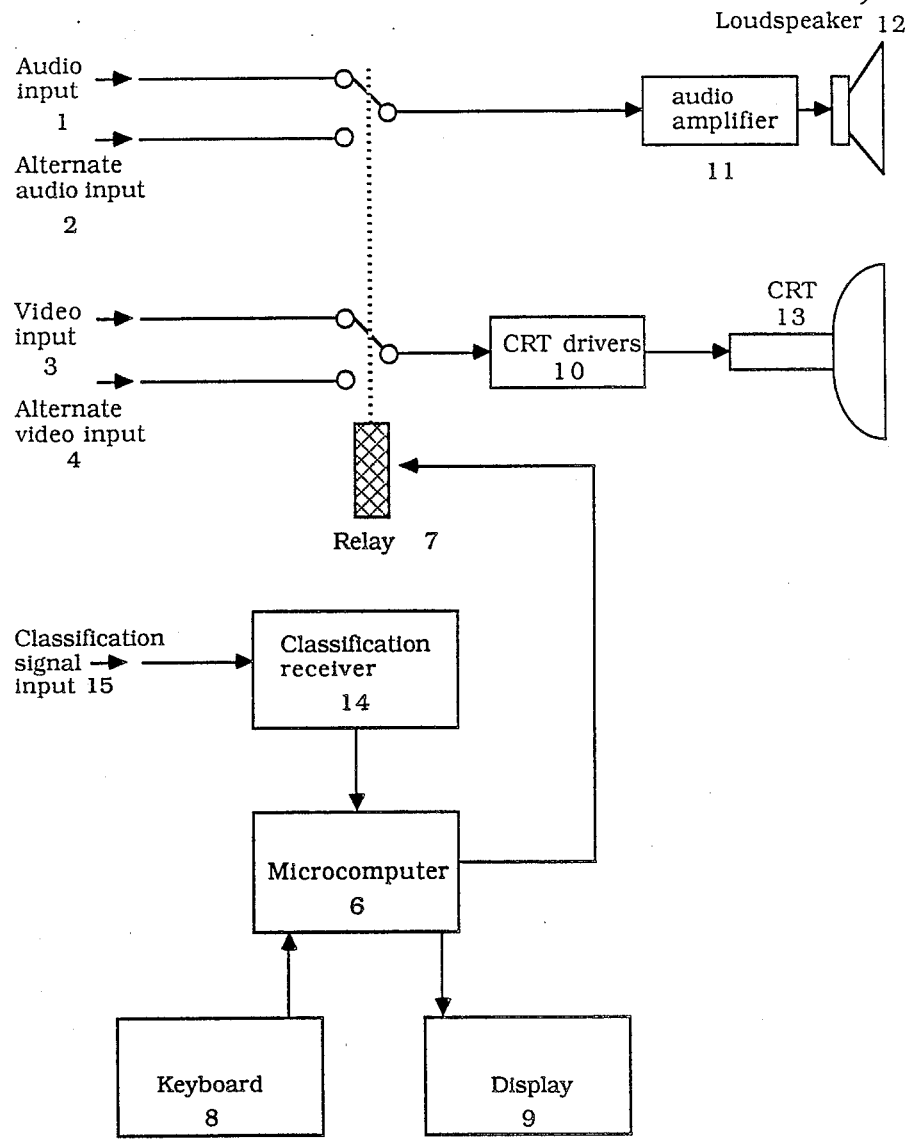
FIG. 5 is a schematic block diagram of a second embodiment of the invention in which the program classification is received by the invention from a transmission source other than the program to be censored.

A second embodiment of the invention is shown in FIG. 5. This embodiment is similar to the first embodiment, except that classification codes are received from a source separate from the source of video program. In this case, classification receiver 14 is provided to receive classification signal input 15, which can arrive from any source, for example a radio transmitter distinct from the transmitter broadcasting the video program. This embodiment of the invention is not suited to operation with prerecorded tapes as program source. Operation of this embodiment is the same as the first embodiment, except that classification codes are read from classification receiver 14, rather than line code extractor 5, by microcomputer 6. The software executed by microcomputer 6 is also the same. The capabilities of both embodiments could easily be combined.

The foregoing describes only some embodiments of the present invention and modifications, obvious to those skilled in the art, can be made without departing from the scope of the present invention.

For example, in cases where a broadcast program is being viewed, more than one channel of broadcast is available, and the classification signal is being received from a source other than the broadcast being received, it is desirable that each classification code received be identified as relating to a particular channel, so that censorship can be based on which channel is being viewed or recorded. This feature is easily added to the embodiments described, especially in cases where the keyboard and microcomputer of the invention are also used to control the channel selection functions of the television receiver.

For the purpose of implementing the invention without needing to modify the television receiver, the invention can comprise a standard television receiver in combination with a special controller which controls operation of the receiver by means of the remote control interface of the television receiver, if the receiver is equipped with remote control. That is, the censorship controller is equipped with interface means compatible with the remote control communication standard, for example an infra-red transmitter, so muting, blanking, channel-changing, or other censorship actions can be effected using unmodified receiving equipment. The channel-change function can provide the facility of displaying alternative material during periods of censorship. For example, a suitable pattern generator tuned to an unused television channel could be used to provide "electronic wallpaper" during commercial breaks. In some applications it may be desirable to implement some functions of the invention, such as PIN entry, in the remote controller, and other functions, such as the censorship function, in the receiver.

Whereas the switching means of the embodiments described herein is a relay, any form of suitable switch, such as a solidstate arrangement, can be used.

The alternative material selected during censorship periods can originate from a remote source, for example another television broadcast, or locally, for example from a video disk or tape player. The local source may also be simply a black signal generator. Furthermore, the invention is not limited to providing only one alternative program source.

Whereas one embodiment of the invention described above relies upon signals encoded into the video portion of the received program, the invention can also be effectively implemented using signals embedded into the audio portion of the program, using any of the available well-known techniques which do not interfere with normal sound reception.

What I claim is:

1. A video program reception method comprising the steps of:
   storing in memory means a set of codes descriptive of video program classifications,
   receiving a video signal and associated audio signal if present,
   receiving a program classification code descriptive of said video signal,
   accessing said memory means and comparing the contents thereof with said code, and,
   if the result of said comparison indicates that the received program is to be displayed, causing the received video signal to be selected for display,
   if the result of said comparison indicates that an alternative video signal is to be displayed, causing an alternative source of video signal to be selected for display; and displaying the selected video signal on a video display means.

2. A video program reception method according to claim 1, wherein the alternative source of video signal originates from a remote transmitter.

3. A video program reception method according to claim 1, wherein the alternative source of video signal is local to the receiving station.

4. A video program reception method according to claim 1, comprising the further steps of:
inputting from the user a personal identity number,
comparing said number to a stored number, and if said numbers are equal,
permitting the user to alter the codes stored within said memory means.

5. A video program reception method according to claim 4, wherein the alternative source of video signal originates from a source remote to the receiver.

6. A video program reception method according to claim 4, wherein the alternative source of video signal is local to the receiving station.

7. A video program reception method according to claim 6, wherein the alternative source of video signal is a local video pattern generator equipped to generate at least a black pattern.

8. A video program reception method according to claim 4, wherein the program classification code is encoded into the video component of the program.

9. A video program reception method according to claim 4, wherein the program classification code is encoded into the audio component of the program.

10. A video program reception method according to claim 4, wherein the program classification code is not encoded into the program being received but is received from a separate source.

11. A video program reception method according to claim 1, wherein the program classification code is encoded into the video component of the program.

12. A video program reception method according to claim 1, wherein the program classification code is encoded into the audio component of the program.

13. A video program reception method according to claim 1, wherein the program classification code is not encoded into the program being received but is received from a separate source.

14. A video program receiver comprising:
a video signal receiver,
a program classification code receiver,
a program classification code memory,
means for accessing said memory and comparing the contents thereof with received codes,
selector means equipped to cause a received video signal to be selected for display if the result of said comparison indicates that the received program is to be displayed and to cause an alternative source of video signal to be selected for display if the result of said comparison indicates that an alternative video signal is to be displayed, and
means for displaying the selected video signal.

15. A video program receiver according to claim 14, wherein the alternative source of video signal originates from a remote transmitter.

16. A video program receiver according to claim 14, wherein the alternative source of video signal is local to the receiving station.

17. A video program receiver according to claim 14, further comprising:
means for inputting from the user a personal identity number,
means for comparing said number to a stored number,
and control means permitting the user to alter the contents of said memory only if the compared numbers are equal.

18. A video program receiver according to claim 17, wherein the alternative source of video signal originates from a source remote to the receiver.

19. A video program receiver according to claim 17, wherein the alternative source of video signal is local to the receiving station.

20. A video program receiver according to claim 19, wherein the alternative source of video signal is a local video pattern generator equipped to generate at least a black pattern.

21. A video program receiver according to claim 17, including means for deriving the program classification code from the video component of the program.

22. A video program receiver according to claim 17, including means for deriving the program classification code from the audio component of the program.

23. A video program receiver according to claim 17, including means for receiving program classification code from a source other than the program being received.

24. A video program receiver according to claim 14, including means for deriving the program classification code from the video component of the program.

25. A video program receiver according to claim 14, including means for deriving the program classification code from the audio component of the program.

26. A video program receiver according to claim 14, including means for receiving program classification code from a source other than the program being received.

* * * * *

(12) EX PARTE REEXAMINATION CERTIFICATE (6744th)
United States Patent
Vogel

(10) Number: US 4,930,160 C1
(45) Certificate Issued: Apr. 7, 2009

(54) AUTOMATIC CENSORSHIP OF VIDEO PROGRAMS

(75) Inventor: Peter S. Vogel, Faulconbridge (AU)

(73) Assignee: Guardian Media Technologies Ltd., La Jolla, CA (US)

Reexamination Request:
No. 90/007,733, Sep. 26, 2005
No. 90/008,243, Sep. 29, 2006

Reexamination Certificate for:
Patent No.: 4,930,160
Issued: May 29, 1990
Appl. No.: 07/237,176
Filed: Aug. 29, 1988

(30) Foreign Application Priority Data

Sep. 2, 1987 (AU) .............................................. P14107

(51) Int. Cl.
*G11B 27/10* (2006.01)
*H04N 7/16* (2006.01)

(52) U.S. Cl. ....................... 725/30; 340/5.74; 348/E7.06; 380/241; 725/142; 725/20; 725/28; 725/34

(58) Field of Classification Search ........... 348/632–634
See application file for complete search history.

(56) References Cited

U.S. PATENT DOCUMENTS

| | | | |
|---|---|---|---|
| 3,673,318 A | 6/1972 | Olsen ....................... 178/5.8 R |
| 3,859,457 A | 1/1975 | Kirk ........................... 178/5.1 |
| 3,919,462 A | 11/1975 | Hartung ...................... 178/5.1 |
| 3,919,479 A | 11/1975 | Moon ............................ 179/1 |
| 4,068,264 A * | 1/1978 | Pires .......................... 380/233 |
| 4,114,139 A | 9/1978 | Boyd .......................... 340/147 |
| 4,215,366 A | 7/1980 | Davidson .................... 358/124 |
| 4,225,884 A | 9/1980 | Block ......................... 358/122 |
| 4,229,765 A | 10/1980 | Sanger ........................ 358/188 |
| 4,245,245 A | 1/1981 | Matsumoto ................. 358/122 |
| 4,266,098 A | 5/1981 | Novak ......................... 179/5.5 |
| 4,280,139 A | 7/1981 | Mogi .......................... 358/165 |
| 4,325,078 A | 4/1982 | Seaton ........................ 358/117 |
| 4,331,974 A | 5/1982 | Cogswell ...................... 358/86 |
| 4,333,110 A | 6/1982 | Faerber ........................ 358/165 |
| 4,338,628 A | 7/1982 | Payne .......................... 358/120 |
| 4,348,696 A | 9/1982 | Beier .......................... 358/188 |
| 4,354,201 A | 10/1982 | Sechet ........................ 358/122 |
| 4,375,651 A | 3/1983 | Templin .................... 358/191.1 |
| 4,386,436 A | 5/1983 | Kocher ....................... 455/151 |
| 4,398,193 A | 8/1983 | Kuniyoshi ............. 340/825.76 |
| 4,425,579 A | 1/1984 | Merrell ........................ 358/86 |
| 4,484,217 A * | 11/1984 | Block et al. .................... 725/1 |
| 4,488,179 A | 12/1984 | Kriiger ....................... 358/181 |

(Continued)

FOREIGN PATENT DOCUMENTS

| | | |
|---|---|---|
| AU | 536261 B | 5/1982 |
| AU | 80145-82 | 10/1982 |
| AU | 56757-86 | 11/1986 |
| EP | A-0053885 | 6/1982 |
| EP | 0112575 A1 | 12/1983 |
| EP | 0112575 B1 | 3/1986 |
| GB | 1424739 A | 2/1976 |
| GB | 8138341 | 6/1983 |
| GB | 2206759 A | 1/1989 |
| GB | 2206759 B | 1/1992 |
| JP | 59-120782 | 11/1984 |

OTHER PUBLICATIONS

Rae Atkey, "How You Can Censor Your Child's TV Viewing," The News Editorial (Adelaide) Aug. 25, 1986.

*Primary Examiner*—Ovidio Escalante

(57) ABSTRACT

A video program is received from a broadcast or video recording and displayed for viewing. On receipt of a prescribed classification code or group of codes display is switched to an alternative source. The classification code can be encoded into the broadcast or tape being viewed, or can originate from a separate source. The alternative material displayed can be another broadcast, a local recording, a locally-generated pattern, or other material. The codes which cause the display to be switched to the alternative source can be set by the user after entering a personal identity number.

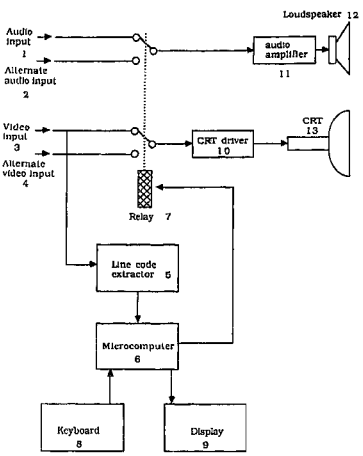

U.S. PATENT DOCUMENTS

| | | | |
|---|---|---|---|
| 4,510,623 A | 4/1985 | Bonneau | 455/181 |
| 4,520,404 A | 5/1985 | Von Kohorn | 358/355 |
| 4,528,588 A | 7/1985 | Löfberg | 358/122 |
| 4,528,589 A * | 7/1985 | Block et al. | 380/241 |
| 4,530,008 A | 7/1985 | McVoy | 358/123 |
| 4,536,791 A | 8/1985 | Campbell | 358/122 |
| 4,554,584 A | 11/1985 | Elam et al. | 358/165 |
| 4,588,857 A | 5/1986 | Arsem | 179/6.06 |
| 4,591,664 A | 5/1986 | Freeman | 179/6.06 |
| 4,595,950 A | 6/1986 | Löfberg | 358/122 |
| 4,598,288 A | 7/1986 | Yarbrough | 340/825.34 |
| 4,599,647 A | 7/1986 | George | 358/122 |
| 4,600,921 A | 7/1986 | Thomas | 340/825.31 |
| 4,602,297 A | 7/1986 | Reese | 360/14.1 |
| 4,605,964 A | 8/1986 | Chard | 358/147 |
| 4,605,973 A | 8/1986 | Von Kohorn | 358/335 |
| 4,620,229 A | 10/1986 | Amano | 380/23 |
| 4,633,297 A | 12/1986 | Skerlos et al. | |
| 4,670,857 A | 6/1987 | Rackman | 380/4 |
| 4,685,131 A | 8/1987 | Horne | 380/20 |
| 4,695,904 A | 9/1987 | Shinyagaito | 358/342 |
| 4,696,034 A | 9/1987 | Wiedemer | 380/16 |
| 4,718,107 A | 1/1988 | Hayes | 455/4 |
| 4,729,044 A | 3/1988 | Kiesel | 360/14.3 |
| 4,750,213 A | 6/1988 | Novak | 455/67 |
| 4,768,229 A | 8/1988 | Benjamin et al. | |
| 4,787,063 A | 11/1988 | Muguet | 364/900 |
| 4,814,883 A | 3/1989 | Perine | 358/181 |
| 4,837,623 A * | 6/1989 | Motoyama | 348/633 |
| 4,888,796 A | 12/1989 | Olivo, Jr. | 379/101 |
| 4,896,354 A | 1/1990 | Inagaki et al. | |
| 4,939,596 A | 7/1990 | Takayama | 360/27 |

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 3, 6, 7, 16, 19 and 20 is confirmed.

Claims 1–2, 4–5, 8–15, 17, 18 and 21–26 are cancelled.

\* \* \* \* \*